United States Patent [19]
Ballet

[11] Patent Number: 4,844,375
[45] Date of Patent: Jul. 4, 1989

[54] WINDER FOR A SAFETY BELT

[75] Inventor: Jean-Noël Ballet, Aillevillers, France

[73] Assignee: ECIA-Equipments et Composants pour l'Industrie Automobile, France

[21] Appl. No.: 204,829

[22] Filed: Jun. 10, 1988

[30] Foreign Application Priority Data

Jun. 12, 1987 [FR] France .................. 87 08222

[51] Int. Cl.$^4$ .................. B60R 22/38; B60R 22/40
[52] U.S. Cl. .................. 242/107.4 A; 242/107.4 B; 242/107.4 C
[58] Field of Search .................. 242/107.4 A, 107.4 B, 242/107.4 C, 107; 280/806; 297/478

[56] References Cited

U.S. PATENT DOCUMENTS

| | | | |
|---|---|---|---|
| 3,941,330 | 3/1976 | Ulrich | 242/107.4 R |
| 4,159,809 | 7/1979 | Rawson | 242/107 |
| 4,509,706 | 4/1985 | Thomas | 242/107.4 A |

FOREIGN PATENT DOCUMENTS 0067322 5/1982 European Pat. Off.
8507211 3/1985 Fed. Rep. of Germany.

Primary Examiner—John M. Jillions
Attorney, Agent, or Firm—Sughrue, Mion, Zinn, Macpeak & Seas

[57] ABSTRACT

The winder, which is more particularly of the type comprising a spring-biased tightener and is automatically locked under the control of an inertia unit, comprises a strap hub mounted on a base to be rotatable about its axis and movable in a direction perpendicular to the axis. This hub carries journals engaged in bearings (50) which are directly or indirectly connected to the base by at least one element (51) which is preferably in the form of a deformable and relatively elastic small bar. Application in safety belts for automobiles.

18 Claims, 4 Drawing Sheets

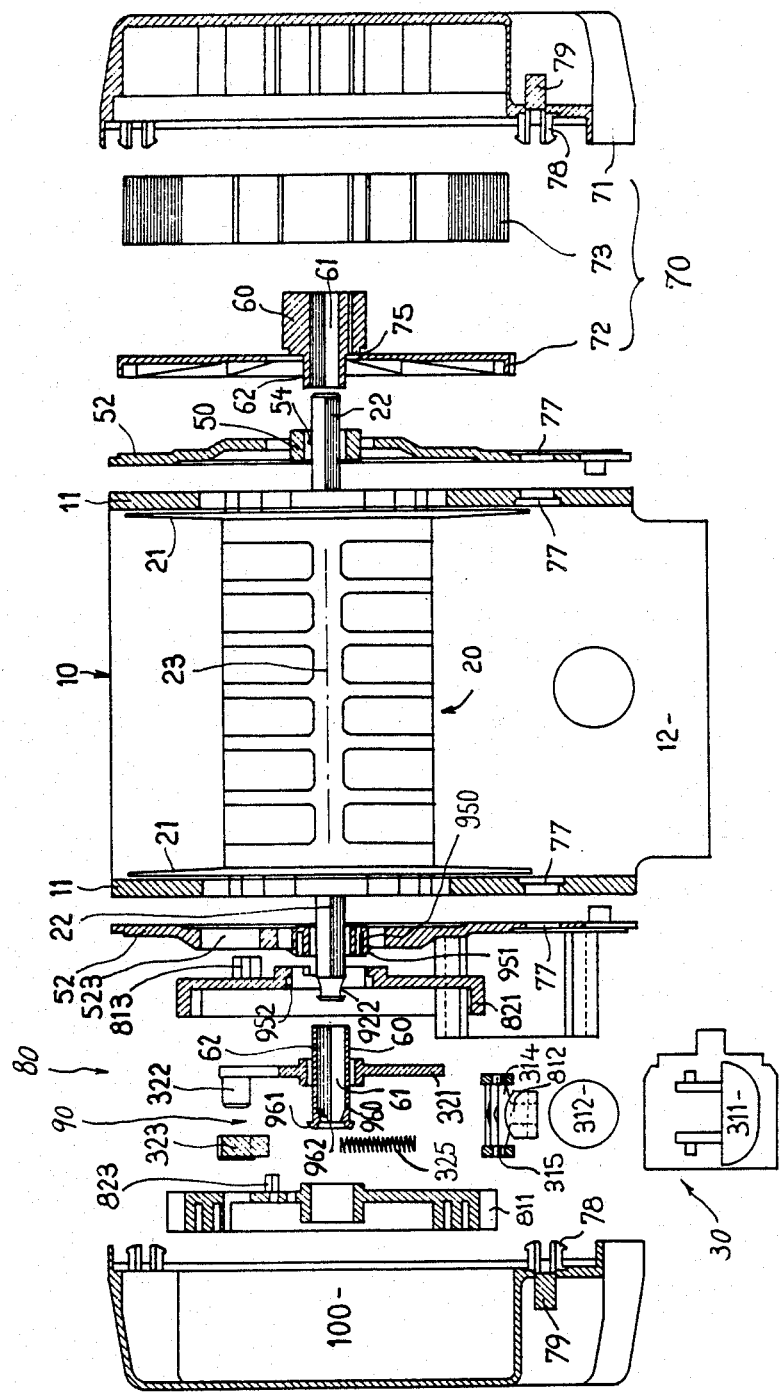
FIG_2

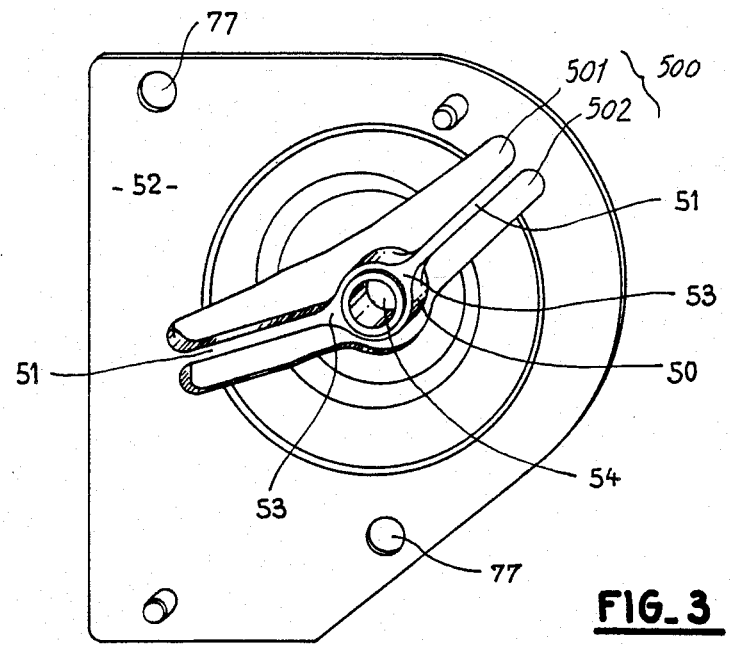
FIG_3
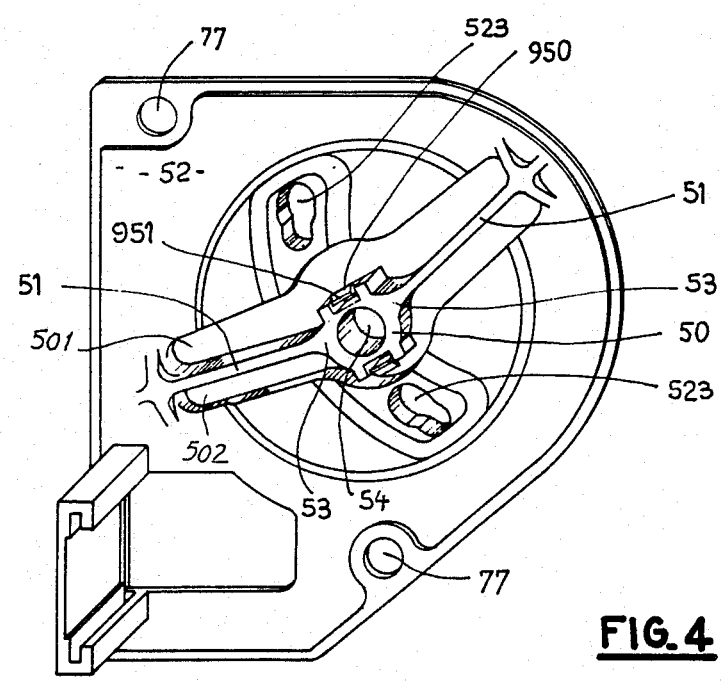
FIG_4

WINDER FOR A SAFETY BELT

BACKGROUND OF THE INVENTION

The present invention relates to winders for safety belts and more particularly to a winder for a safety belt which has a tightener employing a spring and is automatically locked under the control of an inertia unit.

As is known, as required by the public authorities, ground automobile vehicles are mass-produced already equipped with safety belts.

For the comfort of the passengers, these safety belts are provided with a winder which includes a spring-biased tightener and is automatically locked under the control of an inertia unit. In this way, the strap of the safety belt, which is usually held taut and applied against the passenger, is provided with a certain possibility of mobility if the movements to which it is subjected are not too sudden. Otherwise, in the case of sudden movements acting on the strap, the latter is automatically locked or blocked under the action of an inertia unit which is responsive both to the horizontal component of the deceleration of the vehicle and to the tangential component of the acceleration of the unwinding of the strap in opposition to the force exerted by the return spring of the tightener. When the strap is thus immobilized, the stresses to which it is subjected by the forces exerted thereon by the passenger are transmitted to the structure of the vehicle.

It will therefore be understood that, in the event of a sudden deceleration of the vehicle which may be as much as several "g", the winder of the safety belt is subjected to particularly severe stresses which it must resist if it is not to lose its effectiveness. This is why the immobilization of the hub on which the strap of the safety belt is wound is effected in two stages. Whether it is upon the detection of a tangential or horizontal component of acceleration which exceeds a predetermined value, the hub is first of all immobilized in rotation and then finally locked by means which are capable of withstanding considerable forces.

In order to obtain such an automatic locking which occurs as just recalled, the hub on which and from which the strap of the safety belt is wound, is movable both in rotation about its axis and in translation in a direction perpendicular to its axis of rotation.

Various arrangements have already been proposed to obtain these two degrees of freedom.

According to a method proposed by the French patent 2 367 508, the bearing in which the hub is movable are relatively free and are movable without guiding in an opening which has a substantially "delta" triangular configuration formed in the parallel walls of a U-shaped base.

According to another arrangement disclosed by the European patent 0 112 033, these bearings are movable in translation in slots provided in end plates which are so mounted as to be pivotable on the parallel walls of a U-shaped base.

Neither of these arrangements is fully satisfactory.

Indeed, the first arrangement is such that the bearings are not effectively guided since they are free to move in openings having dimensions exceeding the dimensions of the bearings. The axis of the hub may be inclined and become askew.

The second of these arrangements is prohibitive since it is complicated and employs many components which are expensive to manufacture and assemble.

SUMMARY OF THE INVENTION

An object of the invention is to provide a winder for a safety belt of the indicated type which is simple to manufacture and assemble and ensures a precise guiding of the bearings of the hub.

The invention provides a winder for a safety belt which winder includes a spring-biased tightener and is automatically locked under the control of an inertia unit.

This winder comprises a base which has two substantially parallel opposed walls, a hub for receiving a strap which is provided in the vicinity of each of its ends with a cheek and a journal and which is mounted in the base in such manner as to be rotatable about its axis and movable in a direction perpendicular to said axis between an inoperative position in which the hub is rotatable and an operative position in which the hub cannot rotate, the passage from one to the other of said two positions being under the control of the inertia unit, complementary locking means one of which is associated with the walls of the base while the other is associated with the cheeks of the hub and are adapted to cooperate when the hub is in its operative position in order to prevent it from rotating, and bearings for receiving the journals of the hub which are so mounted as to be capable of rotating about said axis and moving in a direction perpendicular to said axis.

This winder has the feature that each of the bearings is or is not directly connected to one of the walls of the base by at least one deformable element; said element, which is preferably relatively elastic, is, as the case may be, mounted on a side wall fixed to the wall of the base.

Other features of the invention will be apparent from the following description and claims and the accompanying drawing which is given solely by way of example and in which:

BRIEF DESCRIPTION OF THE DRAWING

FIG. 2 is a longitudinal meridian sectional view on the axis of the hub of FIG. 1;

FIG. 3 is an enlarged perspective view of the bearing located on one side of the tightener having a return spring;

FIG. 4 is a similar view of an opposite bearing located adjacent to the inertia unit and the controls;

DETAILED DESCRIPTION OF A PREFERRED EMBODIMENT

As safety belts having a winder are well known in the art, there will only be described hereinafter that which is directly or indirectly related to the invention. As to the rest of the winder, one skilled in the considered art will use conventional solutions at his disposal for solving the particular problems he will meet in accordance with the situations in which he is placed.

Figure 1:
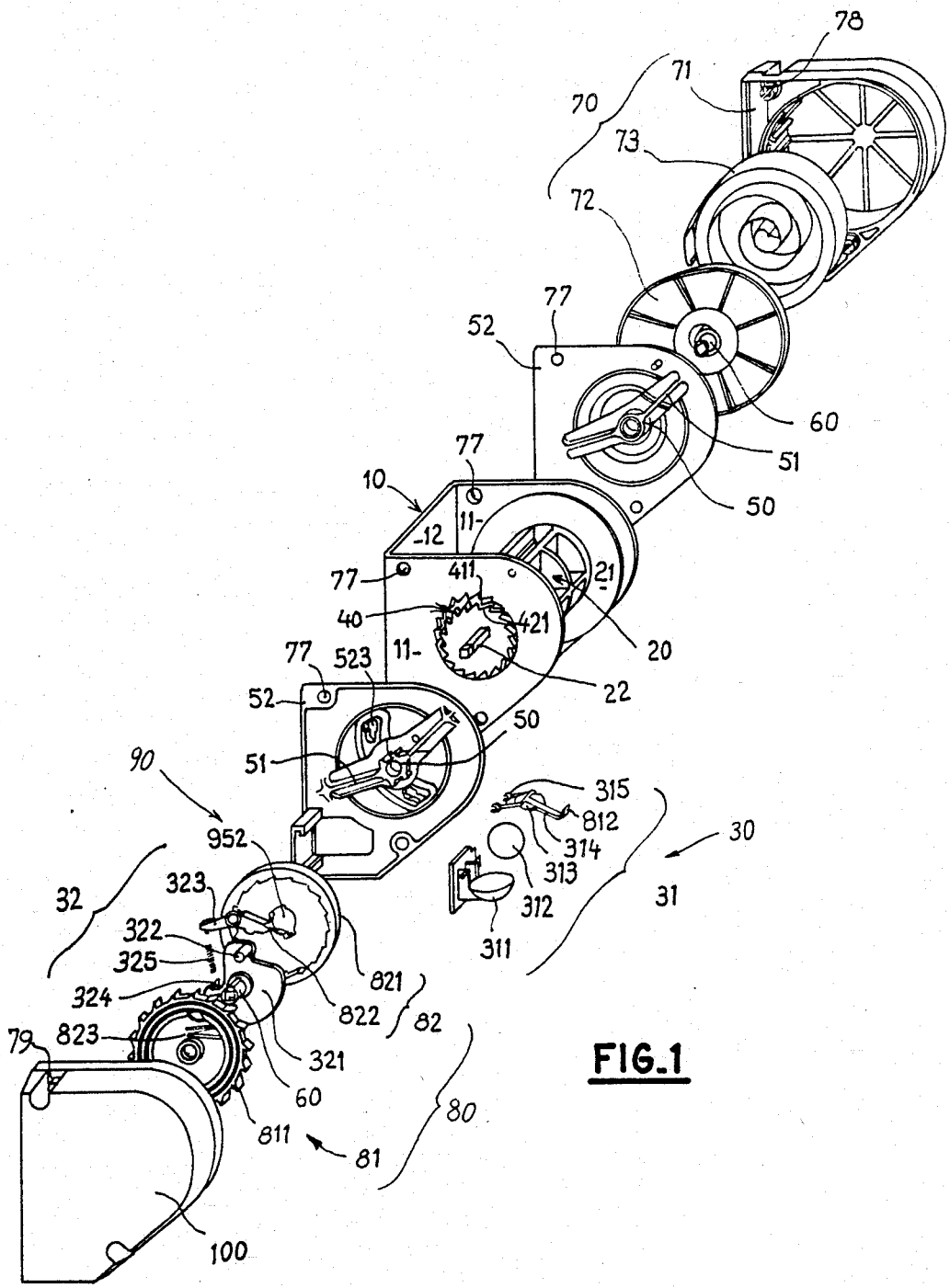
FIG. 1 is an exploded perspective view of an embodiment of the winder according to the invention.

As is seen upon examination in particular of FIGS. 1 and 2 of the drawing, a winder for a safety belt which has a spring-biased tightener and is automatically locked under the control of an inertia unit acording to the invention comprises a base 10, a hub 20, an inertia unit 30, locking means 40, bearings 50. Associated with these components are also sleeves 60, a tightener 70, controls 80 and an assembling device 90.

As can be seen, the base 10 has two substantially parallel walls 11 interconnected by a base plate 12 so that it has a substantially U-shaped configuration.

Disposed in this base 10 is a hub 20. This hub has two lateral opposed cheeks 21 and terminates at each of its ends in a journal 22. This hub is rotatable about its axis 23 and movable substantially in translation in a direction perpendicular to the axis, as will be explained hereinafter. It is on this hub that a strap (not shown) is wound and unwound.

The inertia unit 30 comprises a detector 31 of the horizontal component of the acceleration or deceleration of the vehicle and a detector 32 of the trangential acceleration of the strap.

The detector 31, which is of any conventional type, comprises for example a cup 311 in which bears a ball 312 which is free and above which is placed a dome member 313 carried by a lever 314 which pivots about a shaft 315.

The detector 32 comprises an inertia disc 321 which carries a pivot 322 on which is pivotally mounted a pawl 323 which is biased by a spring 325 and rests against a support 324.

This inertia unit is of conventional type and the operation thereof will be briefly recalled hereinafter.

Placed between the base 10 and the hub 20 are locking means 40 formed by a female set of teeth 411 provided in the walls 11 of the base and a male set of teeth 412 provided on the periphery of the cheeks 21 of the hub. This is clearly shown in the drawing. Depending on whether these complementary sets of teeth are in engagement with each other (FIG. 6B), or not in engagement (FIG. 6A), the hub is locked against rotation or free to rotate respectively.

The bearings 50 each comprise at least one element 51 connected to one of the walls 11 of the base 10, for example through the medium of a side wall 52; this or each element 51 is in the form of a bar which supports a housing 54 to which it is connected by regions 53.

As can be seen, one of the side walls 52, namely that adjacent to the inertia unit, is provided with slots 523 the function of which will be explained hereinafter. All this is clearly shown in FIGS. 1, 3 and 4.

Sleeves 60 are preferably engaged in the housings 54. These sleeves include a cylindrical outer bearing surface 62 and a non-circular inner bore 61 which has for example a square cross-sectional shape.

As can be seen, the cylindrical bearing surfaces 62 are capable of rotating in the housings 54 while the inner bores 61 are adapted to receive the journals 22 of complementary sections of the hub 20, as illustrated.

The winder according to the invention further comprises a tightener 70. This tightener may constitute a pre-assembled unit.

This tightener essentially comprises a case 71 closed by a cap 72 in which a spiral spring 73 is coiled on a sleeve 60. In the initial state, before the tightener is mounted on the base, the spring, one end of which is anchored in the case while the other is anchored on the sleeve, for example by an illustrated slot (carrying no reference numeral), is pre-stressed and retained in this condition since the sleeve 60 is connected to the cap 72 preferably by breakable lugs 75 which are only broken at the moment of the mounting of the tightener 70 on the base 10.

The hub is rotated or immobilized by controls 80 under the control of the inertia unit 30.

These controls 80 comprise, in particular, a sub-assembly 81 under the control of the detector 31 of the deceleration of the vehicle. This sub-assembly 81 comprises, on one hand, a toothed wheel 811 provided on one of its sides with lugs 823 adapted to cooperate with the slots 523 of the side wall 52, as will be explained hereinafter and, on the other hand, a tooth 812 carried by the lever 314. As illustrated and as will be understood hereinafter, this toothed wheel 811 can follow the hub 20 in its movements and also undergo an angular offset relative to the hub when the tangential acceleration of the hub exceeds a predetermined limit value.

These controls 80 also comprise a sub-assembly 82 under the control of the detector 32 of the tangential acceleration of the strap. This sub-assembly 82 comprises a ratchet wheel 821 and a nose 822 which are carried by the pawl 323. The pawl is subjected to the action of a dog 823 of the toothed wheel 811 which exerts an action in opposition to the action of a spring 325.

Figure 5:
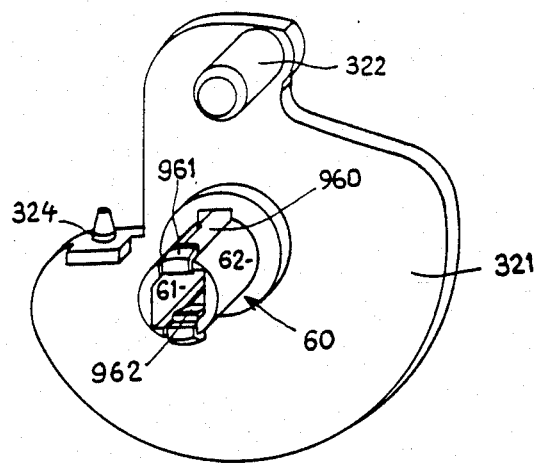
FIG. 5 is a view of a detail of the inertia disc of the inertia unit.

The assembling device 90 having a clipping action comprises, on the bearing 50, as illustrated, at least one elastic finger member 950 terminating in a projection 951 adapted to engage in a non-circular opening 952 of the ratchet wheel 821. In this way, this ratchet wheel cannot undergo a relative rotation. This device comprises, as illustrated, also at least one elastic strip 960 carried by the sleeve 60 connected to the disc 321. This strip carries, on one hand, a shoulder 961 adapted to cooperate with the toothed wheel 811 and, on the other hand, a lug 962 adapted to engage in a recess 922 provided at the free end of one of the journals 22. This is illustrated in particular in FIGS. 2 and 5.

Everything just described is clearly shown in the various Figures of the drawing. With reference in particular to FIGS. 1 and 2, the arrangement of the winder according to the invention and the manner in which it can be assembled and mounted, essentially by a fitting and clipping together, will be understood.

The operation of the winder according to the invention, which will be assumed to have been previously assembled, will now be explained.

There will first of all be briefly recalled the manner in which the inertia unit 30 operates to cause the initial immobilization in rotation of the hub 20 on its axis 23.

If the vehicle undergoes a deceleration exceeding a predetermined value, the ball 312 which rests on its seat in the cup 311, tends to escape from the latter. In doing so, it bears against the dome member 313 fixed to the lever 314 which then pivots about its pin 315. The tooth 812 at the end of the lever 314 then comes to engage in one of the teeth on the periphery of the toothed wheel 811. The toothed wheel 811, which is retained on its periphery, is then immobilized in rotation.

Further, if the tangential component of the acceleration of the strap exceeds a given value, the inertia disc 321 whose sleeve 60 is keyed on the journal 22 of the hub becomes angularly offset relative to the toothed wheel 811 which is rotatable on the cylindrical outer bearing surface 62 of this sleeve. As a result of their relative assembly, the pawl 323 pivots in opposition to the action of the spring 325 and its nose 822 comes to engage against the inner teeth of the ratchet wheel 821 which is keyed in rotation. This pivoting of the pawl 323 results from the action of the dog 823 of the toothed wheel 811 which bears thereagainst. Here again, the toothed wheel 811 is immobilized in rotation and the same is therefore true of the hub which is prevented from doing so by the toothed wheel.

As the hub 20 can no longer rotate, and as it is subjected to a tangential force by the strap which pulls thereon, the hub 20 undergoes therefore a movement in translation in a direction perpendicular to its axis 23 and the complementary sets of teeth 411 and 421 of the locking means 40 interengage. All this is conventional.

Figures 6A, 6B:
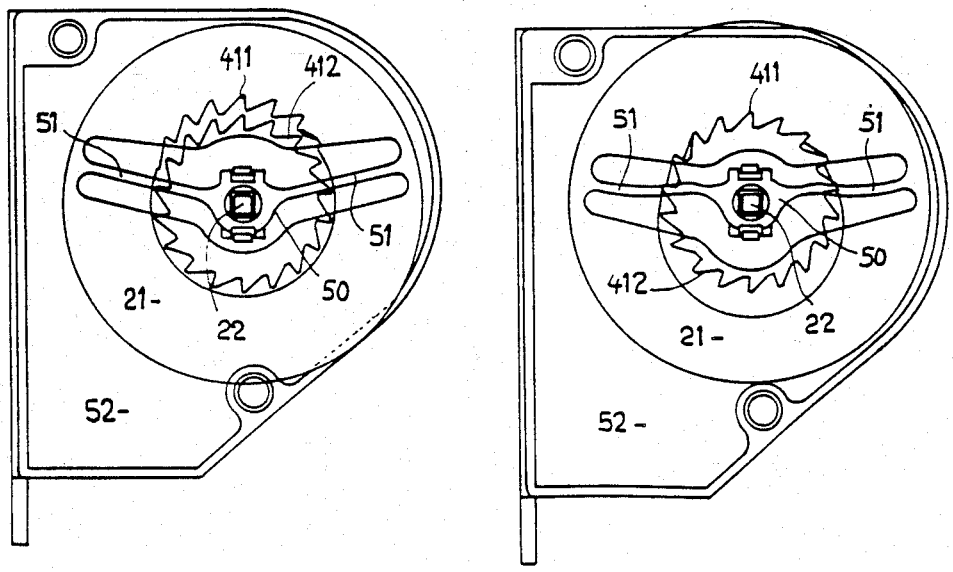
FIGS. 6A and 6B are simplified diagrammatic side elevational views of the part adjacent to the inertia unit, showing the relative positions occupied by the hub relative to its base when the strap is free to be wound on and to be unwound from the hub (FIG. 6A) and when the hub is automatically locked (FIG. 6B); the component parts are assumed to be transparent in order to facilitate the illustration.

With reference to FIGS. 6A and 6B, the manner in which the bearings 50 behave can be seen. Each of the bearings is connected, directly or indirectly, to one of the walls of the base by at least one deformable element 51 which is relatively elastic and is connected to a side wall 52 fixed to the wall 11. It can be seen that each of the bearings 50 is preferably connected by two elements 51 in the shape of a small bar which are disposed substantially symmetrically relative to the direction of displacement of the hub perpendicular to its axis. These elements 51 are anchored to each bearing 50 in substantially diametrically opposed regions and suspend the bearing 50 in a buttonhole-shaped aperture 500 including cut-outs (501, 502) within which the bearing is movable in the plane of the corresponding side wall 52 and without any actual contact with the edge of the aperture. It will be observed that these elements which are in the form of a small bar are, for the inoperative position of the hub, inclined so as to form a V whose point points in a direction away from the active position. It can also be seen that the immobilization of the ratchet wheel 821 as concerns rotation results not only from its mounting on the bearing by means of complementary male and female non-circular geometries, but also from the presence of the lugs 813 which are engaged, with possibility of movement, in the slots 523 for absorbing a large part of the forces and stresses at the moment of the immobilization.

Thus it can be seen that, owing to the invention, the hub is guided with precision while being free to rotate about its axis and to move in a direction perpendicular to the latter without any complicated additional member.

In examining also FIGS. 1 and 2 and the following Figures, it can be seen that the winder according to the invention is provided with an assembling device which permits uniting by a simple clipping action the main components of the inertia unit and the controls. This inertia unit and the controls are protected by a case 100.

The manner in which the various component parts are manufactured will not be further explained. Depending on the forces they must transmit, they are made either from metal or a plastics material. As the manufacturing methods by machining and/or moulding parts of metal or plastics material are well known, no further description will be given thereof.

An examination of the Figures shows that the tightener 70, on one hand, and the inertia unit 30 and the controls 80, on the other hand, may be, if desired, assembled before being associated with the base. The final assembly and the retention are, for example, ensured by elastic "studs" 78 having a breakable locking core 79, illustrated in particular in FIGS. 1 and 2, which are engaged in suitably-adapted apertures 77. Owing to its architecture, the assembling device 90 is simple and easy to assemble by stacking. The procedure will be clear to one skilled in the art with reference more particularly to FIG. 2.

What is claimed is:

1. A winder for a safety belt which has a tightener employing a return spring and is arranged to be automatically locked under the control of an inertia unit, which winder comprises a base having two substantially parallel opposed walls, a hub for receiving a strap, the hub having an axis of rotation and comprising in the vicinity of each end of a hub a cheek and a journal and mounted in said base in such manner as to be rotatable about said axis and to be movable in a direction perpendicular to said axis between an inoperative position in which the hub is rotatable and an operative position in which the hub cannot rotate, the passage of the hub from one to the other of said two positions being under the control of the inertia unit, complementary locking means one of which locking means is associated with said walls of said base while the other of said locking means is associated with the cheeks of the hub, said complementary locking means being cooperative when the hub is in said operative position so as to prevent it from rotating, bearings for receiving the journals of the hub and mounted in such manner as to permit the hub to rotate about said axis and to move in a direction perpendicular to said axis, and at least one deformable and relatively elastic element integral with each of the bearings and connecting each of said bearings to a respective wall of said base, said bearings being movable in respective cut-outs in said walls, and said deformable elements being normally oriented approximately perpendicularly to the direction of the hub movement.

2. A winder for a safety belt which has a tightener employing a return spring and is arranged to be automatically locked under the control of an inertia unit, which winder comprises a base having two substantially parallel opposed base walls, a hub for receiving a strap, the hub having an axis of rotation and comprising in the vicinity of each end of a hub a cheek and a journal and mounted in said base in such manner as to be rotatable about said axis and to be movable in a direction perpendicular to said axis between an inoperative position in which the hub is rotatable and an operative position in which the hub cannot rotate, the passage of the hub from one to the other of said two positions being under the control of the inertia unit, complementary locking means one of which locking means is associated with said walls of said base while the other of said locking means is associated with the cheeks of the hub, said complementary locking means being cooperative when the hub is in said operative position so as to prevent it from rotating, bearings for receiving the journals of the hub and mounted in such manner as to permit the hub to rotate about said axis and to move in a direction perpendicular to said axis, a side wall fixed to each of said base walls of said base, and at least one deformable and relatively elastic element connecting each of said bearings to a respective side wall, said deformable elements being integral with said bearings and said side walls and being movable in respective cut-outs in said side walls.

3. A winder according to claim 2, comprising a sleeve disposed between at least one of the journals of the hub and the associated bearing; and wherein the journal has an outer non-circular cross-sectional shape, the bearing has an inner circular cross-sectional shape, and said sleeve has inner and outer cross-sectional shapes which are respectively complementary to said cross-sectional shapes of the journal and bearing so that said sleeve and journal are keyed to rotate together and said sleeve and bearing are free to rotate relative to each other.

4. A winder according to claim 3, comprising an assembling device employing a clipping together which unites at least a part of the inertia unit, controls, the bearings and the sleeves.

5. A winder according to claim 4, wherein the assembling device comprises at least one elastic finger member which terminates in a projection and which is connected to the bearing cooperating with a non-circular opening provided in a first member of the controls and includes at least one elastic strip of said sleeve which terminates in a shoulder cooperative with another member of the controls and terminates in a lug which is cooperative with a recess in the journal of the hub.

6. A winder according to claim 5, wherein said controls comprise a ratchet wheel and a toothed wheel respectively.

7. A winder according to claim 5, wherein one of said side walls contains slots, said first member of the controls being provided with lugs which are engaged with a certain freedom of movement in corresponding ones of said slots in said one side wall.

8. A winder according to claim 2, wherein the bearing and deformable element are moulded of a plastics material with said side wall.

9. A winder according to claim 1 or 2, wherein two of said deformable elements connect each bearing to a respective wall said two deformable elements being substantially symmetrically arranged relative to the direction of movement of the hub perpendicular to said axis.

10. A winder according to claim 9 wherein each of said deformable elements is anchored to the respective bearing in two substantially diametrically opposed regions.

11. A winder accroding to claim 9, wherein each of said deformable elements is in the form of a small bar and, in said inoperative position of the hub, the small bars of each bearing are inclined relative to each other so as to form a V configuration having a point pointed in a direction away from said operative position.

12. A winder according to claim 1 or 2, wherein each bearing and each deformable element are made from an elastics material.

13. A winder according to claim 12, wherein said plastics material is a moulded plastics material.

14. A winder according to claim 1 or 2, wherein the tightener comprises a case, a cap for closing the case, a spring disposed in the case, a sleeve disposed in the case, the spring being wound around the sleeve and having an end anchored to the case and an opposite end anchored to the sleeve, and breakable lugs for interconnecting the sleeve and the cap, after stressing the spring and before mounting the tightener on said base, said breakable lugs being broken when the tightener is mounted on said base.

15. A winder according to claim 14, wherein the tightener constitutes a pre-assembled unit.

16. A winder according to claim 1 or 2, wherein said deformable elements connect said bearings in such a way that said bearings are maintained out of physical contact with edges of said cut-outs.

17. A winder for a safety belt which has a tightener employing a return spring and is arranged to be automatically locked under the control of an inertia unit, which winder comprises a base having two substantially parallel opposed walls, a hub for receiving a strap, the hub having an axis of rotation and comprising in the vicinity of each end of the hub a cheek and a journal and mounted in said base in such manner as to be rotatable about said axis and to be movable in a direction perpendicular to said axis between an inoperative position in which the hub is rotatable and an operative position in which the hub cannot rotate, the passage of the hub from one to the other of said two positions being under the control of the inertia unit, complementary locking means one of which locking means is associated with said walls of said base while the other of said locking means is associated with the cheeks of the hub, said complementary locking means being cooperative when the hub is in said operative position so as to prevent it from rotating, bearings for receiving the journals of the hub and mounted in such manner as to permit the hub to rotate about said axis and to move in a direction perpendicular to said axis, and at least one deformable and relatively elastic element connecting each of said bearings to the respective wall of said base; said winder further comprising a sleeve disposed between at least one of the journals of the hub and the associated bearing; and wherein the journal has an outer non-circular cross-sectional shape, the bearing has an inner circular cross-sectional shape, and said sleeve has inner and outer cross-sectional shapes which are respectively complementary to said cross-sectional shapes of the journal and bearing so that said sleeve and journal are keyed to rotate together and said sleeve and bearing are free to rotate relative to each other.

18. A winder for a safety belt which has a tightener employing a return spring and is arranged to be automatically locked under the control of an inertia unit, which winder comprises a base having two substantially parallel opposed walls, a hub for receiving a strap, the hub having an axis of rotation and comprising in the vicinity of each end of the hub a cheek and a journal and mounted in said base in such manner as to be rotatable about said axis and to be movable in a direction perpendicular to said axis between an inoperative position in which the hub is rotatable and an operative position in which the hub cannot rotate, the passage of the hub from one to the other of said two positions being under the control of the inertia unit, complementary locking means one of which locking means is associated with said walls of said base while the other of said locking means is associated with the cheeks of the hub, said complementary locking means being cooperative when the hub is in said operative position so as to prevent it from rotating, bearings for receiving the journals of the hub and mounted in such manner as to permit the hub to rotate about said axis and to move in a direction perpendicular to said axis, and at least one deformable and relatively elastic element connecting each of said bearings to the respective wall of said base; wherein each bearing and each deformable element are made from an elastics material; wherein said plastics material is a moulded plastics material; and wherein the bearing and deformable element are moulded with a side wall which side wall is fixed to said wall of said base.

* * * * *